US008595433B2

(12) United States Patent
Beardsley et al.

(10) Patent No.: US 8,595,433 B2
(45) Date of Patent: *Nov. 26, 2013

(54) SYSTEMS AND METHODS FOR MANAGING DESTAGE CONFLICTS

(75) Inventors: Brent C. Beardsley, Tucson, AZ (US); Michael T. Benhase, Tucson, AZ (US); Binny S. Gill, Shrewsbury, MA (US); Lokesh M. Gupta, Tucson, AZ (US); Sonny E. Williams, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,794

(22) Filed: Jun. 11, 2012

(65) Prior Publication Data

US 2012/0254544 A1 Oct. 4, 2012

Related U.S. Application Data

(63) Continuation of application No. 12/965,133, filed on Dec. 10, 2010.

(51) Int. Cl.
*G06F 12/00* (2006.01)

(52) U.S. Cl.
USPC ........................................... 711/113; 711/143

(58) Field of Classification Search
USPC .................................................. 711/113, 143
See application file for complete search history.

(56) References Cited

U.S. PATENT DOCUMENTS

| 7,085,892 | B2 | 8/2006 | Martinez et al. |
| 7,191,207 | B2 | 3/2007 | Blount et al. |
| 7,721,043 | B2 | 5/2010 | Gill et al. |
| 7,725,661 | B2 | 5/2010 | Liu et al. |
| 7,783,836 | B2 | 8/2010 | Wang |
| 7,793,049 | B2 | 9/2010 | Cain et al. |
| 7,805,574 | B2 | 9/2010 | Bell, Jr. et al. |
| 2003/0225948 | A1 | 12/2003 | Jarvis et al. |
| 2007/0156961 | A1 | 7/2007 | Houzenga et al. |
| 2010/0037226 | A1 | 2/2010 | Benhase et al. |

OTHER PUBLICATIONS

Young Jin Nam et al., "An Adaptive High-Low Water Mark Destage Algorithm for Cached RAID5", Proceedings 2002 Pacific Rim International Symposium on Dependable Computing, Dec. 16-18, 2002, Tsukuba City, Ibaraki, Japan, 8 pages.
U.S. Appl. No. 12/965,131, filed Dec. 10, 2010, entitled "Systems and Methods for Managing Cache Destage Scan Times".
U.S. Appl. No. 12/965,141, filed Dec. 10, 2010, entitled "Systems and Methods for Background Destaging Storage Tracks".
U.S. Appl. No. 12/965,174, filed Dec. 10, 2010, entitled "Systems and Methods for Destaging Storage Tracks From Cache".

*Primary Examiner* — Matthew Bradley
(74) *Attorney, Agent, or Firm* — Griffiths & Seaton PLLC

(57) ABSTRACT

A system includes a cache partitioned into multiple ranks configured to store multiple storage tracks and a processor coupled to the cache. The processor is configured to perform the following method. One method includes allocating an amount of storage space in the cache to each rank and monitoring a current amount of storage space used by each rank with respect to the amount of storage space allocated to each respective rank. The method further includes destaging storage tracks from each rank until the current amount of storage space used by each respective rank is equal to a predetermined minimum amount of storage space with respect to the amount of storage space allocated to each rank.

14 Claims, 2 Drawing Sheets

SYSTEMS AND METHODS FOR MANAGING DESTAGE CONFLICTS

CROSS-REFERENCE TO RELATED APPLICATIONS

This application is a Continuation of U.S. patent application Ser. No. 12/965,133, filed on Dec. 10, 2010.

BACKGROUND OF THE INVENTION

1. Field of the Invention

The present invention relates in general computing systems, and more particularly to, systems and methods for managing destage conflicts.

2. Description of the Related Art

Contemporary computer storage systems are known to destage storage tracks from cache to long-term storage devices so that there is sufficient room in the cache for data to be written. When destaging the storage tracks, contemporary storage systems destage the storage tracks from each rank in the cache when the cache is becoming full or the global pressure factor is high. That is, storage tracks are destaged from each rank when the global pressure factor is high, even though some ranks in the cache may only be storing a small number of storage tracks with respect to the amount of storage space allocated to these ranks When a rank is storing a small number of storage tracks with respect to its allocated amount of storage space in the cache, the probably that the rank will experience destage conflicts increases.

SUMMARY OF THE INVENTION

Various embodiments provide systems for reducing destage conflicts in cache. One system comprises a cache partitioned into a plurality of ranks configured to store a plurality of storage tracks and a processor coupled to the cache. In one embodiment, the processor is configured to allocate an amount of storage space in the cache to each rank and monitor a current amount of storage space used by each rank with respect to the amount of storage space allocated to each respective rank. The processor is further configured to destage storage tracks from each rank until the current amount of storage space used by each respective rank is equal to a predetermined minimum amount of storage space with respect to the amount of storage space allocated to each rank.

Also provided are physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product for reducing destage conflicts in a cache partitioned into a plurality of ranks configured to store a plurality of storage tracks. One physical computer storage medium comprises computer code for allocating, by a processor coupled to the cache, an amount of storage space in the cache to each rank and computer code for monitoring a current amount of storage space used by each rank with respect to the amount of storage space allocated to each respective rank. The physical computer storage medium further comprises computer code for destaging storage tracks from each rank until the current amount of storage space used by each respective rank is equal to a predetermined minimum amount of storage space with respect to the amount of storage space allocated to each rank.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Various embodiments provide systems for reducing destage conflicts in cache. Also provided are physical computer storage mediums (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) comprising a computer program product for reducing destage conflicts in a cache partitioned into a plurality of ranks configured to store a plurality of storage tracks.

Figure 1:
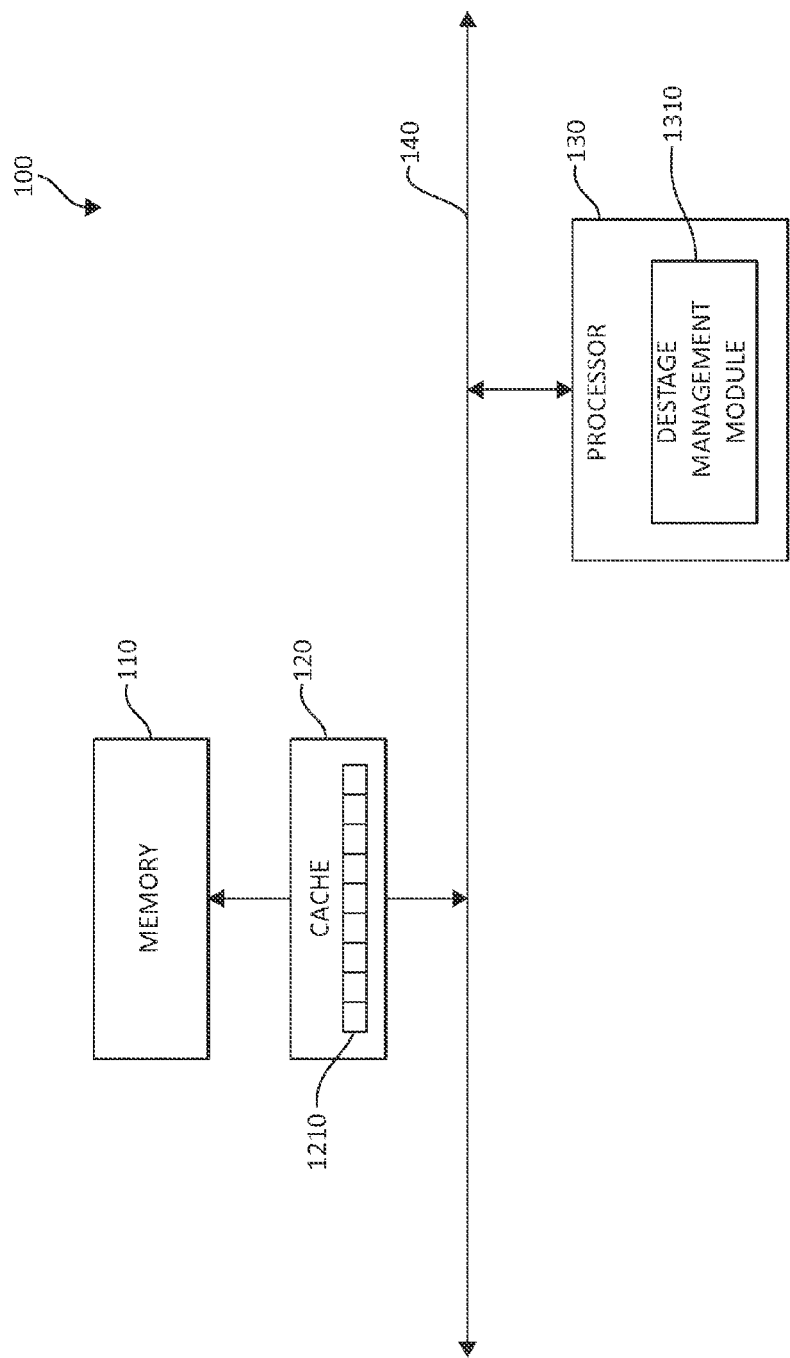
FIG. 1 is a block diagram of one embodiment of a system for reducing destage conflicts in cache.

Turning now to the figures, FIG. 1 is a block diagram of one embodiment of a system 100 for managing destage scan times in cache. At least in the illustrated embodiment, system 100 comprises a memory 110 coupled to a cache 120 and a processor 130 via a bus 140 (e.g., a wired and/or wireless bus).

Memory 110 may be any type of memory device known in the art or developed in the future. Examples of memory 110 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 110, storage tracks are capable of being stored in memory 110. Furthermore, each of the storage tracks can be destaged to memory 110 from cache 120 when data is written to the storage tracks.

Cache 120, in one embodiment, comprises a write cache partitioned into one or more ranks 1210, where each rank 1210 includes one or more storage tracks. Cache 120 may be any cache known in the art or developed in the future.

During operation, the storage tracks in each rank 1210 are destaged to memory 110 in a foreground destaging process after the storage tracks have been written to. That is, the foreground destage process destages storage tracks from the rank(s) 1210 to memory 110 while a host (not shown) is actively writing to various storage tracks in the ranks 1210 of cache 120. Ideally, a particular storage track is not being destaged when one or more hosts desire to write to the particular storage track, which is known as a destage conflict. To reduce the number of destage conflicts in cache 120, processor 130 is configured to execute a method for managing destage conflicts in cache 120.

In various embodiments, processor 130 comprises or has access to a destage management module 1310, which comprises computer-readable code that, when executed by processor 130, causes processor 130 to perform the method for managing destage conflicts in cache 120. In the various embodiments, processor 130 is configured to allocate a predetermined amount of storage space in cache 120 to each rank 1210.

In one embodiment, each rank 1210 is allocated the same predetermined amount of storage space in cache 120. In another embodiment, at least two ranks 1210 are allocated different predetermined amounts of storage space in cache 120. In still another embodiment, each rank 1210 is allocated a different predetermined amount of storage space in cache 120. In each of these embodiments, each predetermined amount of storage space in cache 120 is not to exceed a predetermined maximum amount of storage space.

In various embodiments, processor 130 is configured to allocate the predetermined maximum amount of storage space on a percentage basis. In one embodiment, the predetermined maximum amount of storage space allocated to a respective rank 1210 is in the range of about one percent to about twenty-five percent (1%-50%) of the total storage capacity of cache 120. In another embodiment, the predetermined maximum amount of storage space allocated to a respective rank 1210 is twenty-five percent (25%) of the total storage capacity of cache 120.

In various other embodiments, processor 130 is configured to allocate the predetermined maximum amount of storage space on a storage track basis. That is, each rank 1210 is limited to a predetermined maximum number of storage tracks, which can vary from rank to rank.

Processor 130, in various embodiments, is configured to monitor each rank 1210 in cache 120 and determine the amount of storage tracks each respective rank 1210 is storing with respect to its allocated amount of storage space in cache 120. In one embodiment, processor 130 is configured to determine the amount of storage tracks in each respective rank 1210 on a percentage basis. That is, processor 130 is configured to monitor each rank 1210 and determine the percentage each respective rank 1210 is using to store storage tracks with respect to the individual allocations of the total storage space in cache 120.

In another embodiment, processor 130 is configured to determine the number of storage tracks in each respective rank 1210. Specifically, processor 130 is configured to monitor each rank 1210 and determine the number of storage tracks each respective rank 1210 is using to store storage tracks with respect to the individual allocations of the total storage space in cache 120.

Processor 130, in various embodiments, is configured to destage storage tracks from each respective rank 1210 until a predetermined minimum amount of storage space remains in each respective rank 1210 with respect to its predetermined allocated amount of storage space in cache 120, and then cease to or no longer destage storage tracks from ranks 1210 that are using less than or equal to the predetermined minimum amount of storage space. In one embodiment, processor 130 is configured to destage storage tracks from each rank 1210 until a predetermined percentage (e.g., thirty percent (30%)) of the predetermined amount of storage space in cache 120 is reached. In another embodiment, processor 130 is configured to destage storage tracks from each rank 1210 until a predetermined minimum number of storage tracks is reached.

For example, in an embodiment that includes ten (10) ranks 1210 in which each rank 1210 is allocated 10 percent (10%) of the total storage space of cache 120 and the predetermined minimum amount of storage tracks is thirty percent (30%), processor 130 will continue to destage storage tracks from each rank 1210 that includes more than three percent (3%) of the total storage capacity of cache 120 (i.e., 10%×30%=3%). Once a particular rank 1210 has reached the three percent threshold, processor 130 will cease to or no longer destage storage tracks from the particular storage track until the particular rank 1210 is using more than the predetermined amount of storage tracks is (i.e., three percent of the total storage capacity of cache 120 in this example).

Processor 130, in various embodiments, is configured to utilize a formula to determine the number of destage tasks to utilize when destaging storage tracks from each respective rank 1210. In the various embodiments, the formula is based on the global pressure factor of cache 120 as it relates to each respective rank 1210. That is, the number of destage tasks utilized to destage storage tracks from each respective rank 1210 is proportional to the amount of its allocated storage space each respective rank 1210 is multiplied by the global pressure factor, which is a factor determined by a collective percentage of the total amount of storage space in cache 120 being utilized by ranks 1210.

In one embodiment, the formula includes a predetermined maximum number destage tasks (e.g., forty (40) destage tasks) that is utilized when a particular rank 1210 is utilizing a large amount of its allocated storage space and the global pressure factor is high. In another embodiments, the formula includes a default of zero (0) destage tasks that is utilized when a particular rank 1210 is utilizing an amount of storage space less than or equal to the predetermined minimum amount with respect to its allocated amount of storage space in cache 120.

Figure 2:
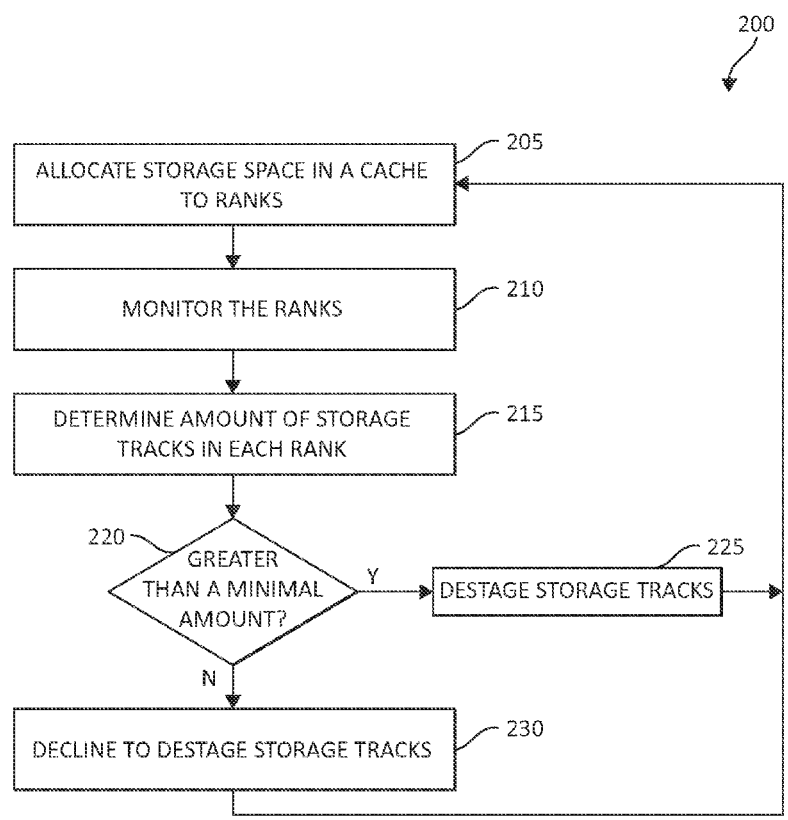
FIG. 2 is a flow diagram of one embodiment of a system for reducing destage conflicts in a cache.

Turning now to FIG. 2, FIG. 2 is a flow diagram of one embodiment of a method 200 for managing destage conflicts in a cache (e.g., cache 120) comprising one or more ranks (e.g., ranks 1210). At least in the illustrated embodiment, method 200 begins by allocating a predetermined amount of storage space in the cache to each rank (block 205).

In various embodiments, the predetermined maximum amount of storage space is allocated on a percentage basis. In one embodiment, the predetermined maximum amount of storage space allocated to a respective rank is in the range of about one percent to about twenty-five percent (1%-50%) of the total storage capacity of the cache. In another embodiment, the predetermined maximum amount of storage space allocated to a respective rank is twenty-five percent (25%) of the total storage capacity of the cache.

In various other embodiments, the predetermined maximum amount of storage space is allocated on a storage track basis. That is, each rank is limited to a predetermined maximum number of storage tracks, which can vary from rank to rank.

Method 200 further comprises monitoring each rank in the cache (block 210) and determining the amount of storage tracks each respective rank is storing with respect to its allocated amount of storage space in the cache (block 215). In one embodiment, the amount of storage tracks in each respective rank is determined on a percentage basis. That is, each rank is monitored and the percentage each respective rank is using to store storage tracks is determined with respect to the individual allocations of the total storage space in the cache.

In another embodiment, the number of storage tracks in each respective rank is determined. Specifically, each rank is monitored and the number of storage tracks each respective rank is using to store storage tracks is determined with respect to the individual allocations of the total storage space in the cache.

Method 200 further comprises determining if the amount of storage tracks in each respective rank is greater a predetermined minimal amount of storage tracks in the cache (block 220). In one embodiment, the predetermined minimal amount of storage tracks is a predetermined percentage (e.g., thirty percent (30%)) of the amount of storage space allocated to each respective rank. In another embodiment, the predetermined minimal amount of storage tracks is a predetermined minimum number of storage tracks.

If the amount of storage tracks in a particular rank is greater than the predetermined minimal amount of storage tracks, method 200 comprises destaging storage tracks from each respective rank that includes an amount of storage tracks greater than the predetermined minimal amount of storage tracks (block 225). Method 200 then returns to monitoring each rank in the cache (block 210).

If the amount of storage tracks in a particular rank is less than or equal to the predetermined minimal amount of storage tracks, method 200 comprises declining to destage or not destaging storage tracks from ranks that are using less than or equal to the predetermined minimum amount of storage space (block 230). Method 200 then returns to monitoring each rank in the cache (block 210).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A method for managing destage conflicts in a cache partitioned into a plurality of ranks configured to store a plurality of storage tracks, the method comprising:
    allocating, by a processor coupled to the cache, an amount of storage space in the cache to each rank;
    monitoring a current amount of storage space used by each rank with respect to the amount of storage space allocated to each respective rank;
    destaging storage tracks from each rank that includes greater than a predetermined percentage of a predetermined amount of storage space with respect to the amount of storage space allocated to each rank until the current amount of storage space used by each respective rank is equal to the predetermined percentage of the predetermined amount of storage space; and
    declining to destage storage tracks from each rank that includes less than or equal to the predetermined percentage of the predetermined amount of storage space.

2. The method of claim 1, further comprising ceasing to destage storage tracks from each rank that includes the predetermined percentage of the predetermined amount of storage space.

3. The method of claim 1, wherein allocating the amount of storage space in the cache comprises allocating no more that twenty five percent (25%) of a total amount of storage space in the cache to any one rank.

4. The method of claim 3, wherein ceasing to destage storage tracks from each rank comprises ceasing to destage storage tracks from each rank that includes less than or equal to thirty percent (30%) of its respective allocated storage space.

5. The method of claim 3, wherein ceasing to destage storage tracks from each rank comprises ceasing to destage storage tracks from each rank that includes less than or equal to a predetermined number of storage tracks.

6. The method of claim 2, wherein destaging storage tracks from each rank comprises:
    determining a current amount of storage tracks in the cache;
    utilizing a formula to determine a current number of destage tasks to utilize to destage storage tracks from the cache, the current number of destage storage tasks based on the current amount of storage tracks in the cache; and
    utilizing the current number of destage storage tasks to destage the plurality of storage tracks.

7. The method of claim 6, wherein ceasing to destage storage tracks comprises reducing the current number of destage tasks to zero on each rank that includes less than or equal to the predetermined percentage of the predetermined amount of storage space.

8. A system for managing destage conflicts in a cache partitioned into a plurality of ranks configured to store a plurality of storage tracks, the method comprising:
    means for allocating an amount of storage space in the cache to each rank;
    means for monitoring a current amount of storage space used by each rank with respect to the amount of storage space allocated to each respective rank;
    means for destaging storage tracks from each rank that includes greater than a predetermined percentage of a predetermined amount of storage space with respect to the amount of storage space allocated to each rank until the current amount of storage space used by each respective rank is equal to the predetermined percentage of the predetermined amount of storage space; and
    means for declining to destage storage tracks from each rank that includes less than or equal to the predetermined percentage of the predetermined amount of storage space.

9. The system of claim 8, further comprising means for ceasing to destage storage tracks from each rank that includes the predetermined percentage of the predetermined amount of storage space.

10. The system of claim 8, wherein allocating the amount of storage space in the cache comprises allocating no more that twenty five percent (25%) of a total amount of storage space in the cache to any one rank.

11. The system of claim 10, wherein the means for ceasing to destage storage tracks from each rank comprises means for ceasing to destage storage tracks from each rank that includes less than or equal to thirty percent (30%) of its respective allocated storage space.

12. The system of claim 10, wherein the means for ceasing to destage storage tracks from each rank comprises means for ceasing to destage storage tracks from each rank that includes less than or equal to a predetermined number of storage tracks.

13. The system of claim 9, wherein the means for destaging storage tracks from each rank comprises:
    means for determining a current amount of storage tracks in the cache;
    means for utilizing a formula to determine a current number of destage tasks to utilize to destage storage tracks from the cache, the current number of destage storage tasks based on the current amount of storage tracks in the cache; and
    means for utilizing the current number of destage storage tasks to destage the plurality of storage tracks.

14. The system of claim 13, wherein the means for ceasing to destage storage tracks comprises means for reducing the current number of destage tasks to zero on each rank that includes less than or equal to the predetermined percentage of the predetermined amount of storage space.

* * * * *